(12) United States Patent
Saenger Nayver et al.

(10) Patent No.: US 10,444,575 B2
(45) Date of Patent: Oct. 15, 2019

(54) ELECTRO-OPTIC ELEMENT WITH IMI LAYER

(71) Applicant: Gentex Corporation, Zeeland, MI (US)

(72) Inventors: Mario F. Saenger Nayver, Zeeland, MI (US); George A. Neuman, Holland, MI (US); John S. Anderson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 40 days.

(21) Appl. No.: 15/650,559

(22) Filed: Jul. 14, 2017

(65) Prior Publication Data

US 2018/0017823 A1    Jan. 18, 2018
US 2018/0180923 A9    Jun. 28, 2018

Related U.S. Application Data

(60) Provisional application No. 62/363,043, filed on Jul. 15, 2016.

(51) Int. Cl.
    *G02F 1/1343*      (2006.01)
    *B60R 1/08*      (2006.01)
    (Continued)

(52) U.S. Cl.
    CPC .......... *G02F 1/13439* (2013.01); *B60K 35/00* (2013.01); *B60R 1/088* (2013.01);
    (Continued)

(58) Field of Classification Search
    CPC ..... B60R 1/08; B60R 1/088; C09K 2211/187; C03C 17/3657; C03C 17/3668;
    (Continued)

(56) References Cited

U.S. PATENT DOCUMENTS 697,499 A    4/1902   Kromenaker
6,654,070 B1   11/2003   Rofe
(Continued)

FOREIGN PATENT DOCUMENTS

EP      2131227 A2    12/2009
WO   2016081858 A1    5/2016

*Primary Examiner* — Loha Ben
(74) *Attorney, Agent, or Firm* — Price Heneveld LLP; Bradley D. Johnson

(57) ABSTRACT

An electro-optic assembly includes a first partially reflective, partially transmissive substrate defining a first surface and a second surface. A second partially reflective, partially transmissive substrate defines a third surface and a fourth surface. A space is defined between a first substrate and a second substrate. A seal is disposed about a perimeter of the first and second substrates. An electro-optic material is disposed between the second surface of the first substrate and the third surface of the second substrate. The electro-optic assembly is operable to change at least one of a reflectance state and a transmittance state in either a discrete or continuous manner. A transparent electrode coating is disposed between the second surface and the third surface. The transparent electrode coating includes an insulator layer, metal layer, and insulator layer (IMI) structure. The reflectance off of the transparent electrode coating is less than about 2%.

21 Claims, 14 Drawing Sheets

(51) Int. Cl.
*G02F 1/1362* (2006.01)
*G02F 1/157* (2006.01)
*G02F 1/155* (2006.01)
*G09G 3/38* (2006.01)
*G02F 1/163* (2006.01)
*B60K 35/00* (2006.01)
*C03C 17/36* (2006.01)
*G09G 3/19* (2006.01)

(52) U.S. Cl.
CPC ...... *C03C 17/3657* (2013.01); *C03C 17/3668* (2013.01); *G02F 1/1362* (2013.01); *G02F 1/155* (2013.01); *G02F 1/157* (2013.01); *G02F 1/163* (2013.01); *G09G 3/38* (2013.01); *B60K 2370/27* (2019.05); *B60K 2370/334* (2019.05); *B60K 2370/37* (2019.05); *C03C 2217/94* (2013.01); *C09K 2211/187* (2013.01); *G02F 2001/1552* (2013.01); *G09G 3/19* (2013.01)

(58) Field of Classification Search
CPC ............. C03C 2217/94; G02F 1/13439; G02F 1/1362; G02F 1/15; G02F 1/153; G02F 1/155; G02F 1/157; G02F 1/163; G02F 2001/1552; G02F 1/03; G02F 1/07; G02F 1/1335; B60K 35/00; B60K 2350/2052; B60K 2350/2078; B60K 2350/2095; B60K 2370/27; B60K 2370/37; B60K 2370/334; G09G 3/19; G09G 3/34; G09G 3/38; B32B 17/10174; B32B 17/10513; G02B 1/10; G02B 27/01; G02B 27/0101; G02B 2027/0118; G02B 27/14
USPC .............. 359/245, 265, 267, 275, 246, 247, 359/252–254, 629, 630; 345/105, 7, 8; 349/5, 11, 16, 61, 62, 96, 104–106
See application file for complete search history.

(56) References Cited

U.S. PATENT DOCUMENTS

| | | | | |
|---|---|---|---|---|
| 7,978,393 | B2 * | 7/2011 | Tonar | B60R 1/088 359/265 |
| 8,169,684 | B2 * | 5/2012 | Bugno | B60R 1/088 359/265 |
| 8,559,092 | B2 * | 10/2013 | Bugno | B60R 1/088 359/265 |
| 9,056,584 | B2 * | 6/2015 | Fish, Jr. | B60R 1/025 |
| 9,701,248 | B2 * | 7/2017 | Neuman | B60R 1/025 |
| 10,101,583 | B2 * | 10/2018 | Saenger Nayver | G02B 5/23 |
| 2003/0192991 | A1 | 10/2003 | Rukavina et al. | |
| 2004/0160657 | A1 | 8/2004 | Tonar et al. | |
| 2004/0233552 | A1 | 11/2004 | Tonar et al. | |
| 2007/0206263 | A1 | 9/2007 | Neuman et al. | |
| 2008/0218434 | A1 | 9/2008 | Kelly et al. | |
| 2016/0147126 | A1 | 5/2016 | Cammenga et al. | |
| 2018/0017834 | A1 * | 1/2018 | Neuman | G02B 27/01 |

* cited by examiner

FIG. 8 Yr, Yt and A for symmetric IMI structures on a PC/glass interface

FIG. 13

| Thickness (nm) | Bulk Resistivity (microohm-cm) | | | | |
|---|---|---|---|---|---|
| | 10 | 8 | 6 | 4 | 2 |
| 1 | 100.0 | 80.0 | 60.0 | 40.0 | 20.0 |
| 2 | 50.0 | 40.0 | 30.0 | 20.0 | 10.0 |
| 4 | 25.0 | 20.0 | 15.0 | 10.0 | 5.0 |
| 6 | 16.7 | 13.3 | 10.0 | 6.7 | 3.3 |
| 8 | 12.5 | 10.0 | 7.5 | 5.0 | 2.5 |
| 10 | 10.0 | 8.0 | 6.0 | 4.0 | 2.0 |
| 12 | 8.3 | 6.7 | 5.0 | 3.3 | 1.7 |
| 14 | 7.1 | 5.7 | 4.3 | 2.9 | 1.4 |
| 16 | 6.3 | 5.0 | 3.8 | 2.5 | 1.3 |

FIG. 14

ELECTRO-OPTIC ELEMENT WITH IMI LAYER

CROSS-REFERENCE TO RELATED APPLICATION

This application claims priority to and the benefit under 35 U.S.C. § 119(e) of U.S. Provisional Application No. 62/363,043, filed on Jul. 15, 2016, entitled "ELECTRO-OPTIC ELEMENT WITH IMI LAYER," the disclosure of which is hereby incorporated herein by reference in its entirety.

FIELD OF THE DISCLOSURE

The present disclosure generally relates to an electro-optic element, and more particularly, to an electro-optic element with an insulator, metal, and insulator (IMI) layer.

SUMMARY OF THE DISCLOSURE

According to one aspect of the present disclosure, an electro-optic assembly includes a first partially reflective, partially transmissive substrate defining a first surface and a second surface. A second partially reflective, partially transmissive substrate defines a third surface and a fourth surface. A space is defined between a first substrate and a second substrate. A seal is disposed about a perimeter of the first and second substrates. An electro-optic material is disposed between the second surface of the first substrate and the third surface of the second substrate. The electro-optic assembly is operable to change at least one of a reflectance state and a transmittance state in either a discrete or continuous manner. A transparent electrode coating is disposed on at least one of the second surface and the third surface. The transparent electrode coating includes an insulator layer, a metal layer, and an insulator layer (IMI) structure. The reflectance off of the transparent electrode coating is less than about 2%.

According to another aspect of the present disclosure, an electro-optic assembly includes a first partially reflective, partially transmissive substrate defining a first surface and a second surface. A second partially reflective, partially transmissive substrate defines a third surface and a fourth surface. An electro-optic material is disposed between the second surface of the first substrate and the third surface of the second substrate. A transparent electrode coating is disposed on at least one of the second surface and the third surface. The transparent electrode coating includes an insulator layer, metal layer, insulator layer (IMI) structure. The reflectance off of the transparent electrode coating is less than about 2%. The IMI structure is on at least one of the second surface and the third surface.

According to yet another aspect of the present disclosure, an electro-optic assembly for a heads up display system includes a first substrate defining a first surface and a second surface. A second substrate defines a third surface and a fourth surface. A space is defined between the first substrate and the second substrate. An electro-optic material is disposed between the second surface of the first substrate and the third surface of the second substrate. The electro-optic assembly is operable to change the transmittance state in either a discrete or continuous manner. A transparent electrode coating is disposed on at least one of the second surface and the third surface. The transparent electrode coating includes an insulator layer, a metal layer, and an insulator layer (IMI) structure. A transmittance of the IMI structure is greater than 80% and the reflectance is less than about 1%.

According to still another aspect of the present disclosure, a variable transmittance electro-optic assembly includes a first partially reflective, partially transmissive substrate defining a first surface and a second surface. A second partially reflective, partially transmissive substrate defines a third surface and a fourth surface. The first substrate and the second substrate are configured to be held in a parallel spaced apart relationship and sealed about a perimeter of the first and second substrates. An electro-optic material is disposed between the second surface and the third surface. A principle fixed transflector includes a transflector coating disposed on at least one of the first and second surfaces. A low reflectance transparent electrode IMI coating is disposed on secondary surfaces of the variable transmittance electro-optic assembly, and is configured for p polarized light such that the electro-optic assembly has a low double image characteristic defined by a ratio of the reflectance of the transflector coating to a net reflectance of at least one of the secondary surfaces, and wherein the ratio is greater than 100.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 13 is a table illustrating examples of IMI stacks with different insulator materials; and FIG. 14 is a table illustrating sheet resistance based on varying thicknesses.

DETAILED DESCRIPTION

Figure 1:
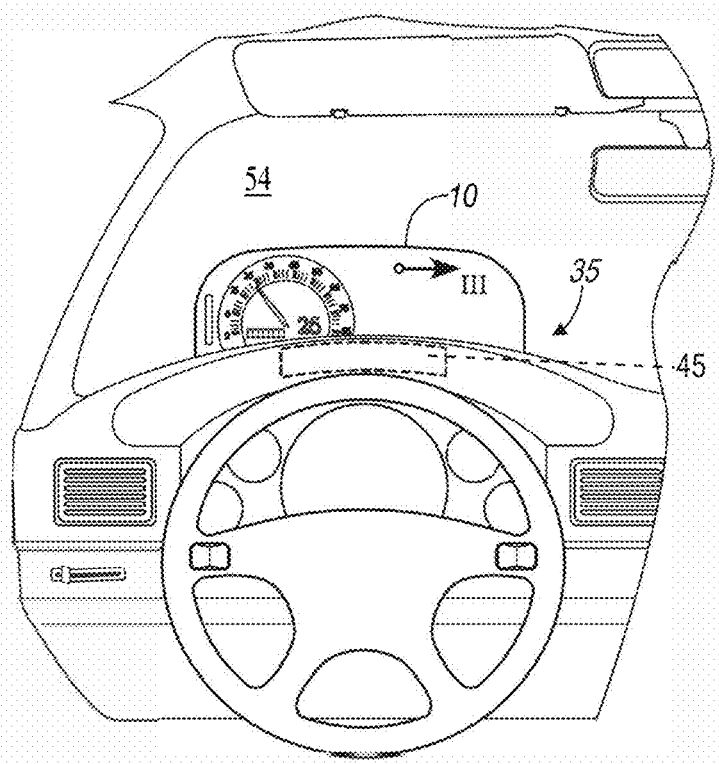
FIG. 1 is a front perspective view of a heads up display system incorporating an electro-optic assembly of the present disclosure.

The present illustrated embodiments reside primarily in combinations of method steps and apparatus components related to an electro-optic element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-12, reference numeral 10 generally designates an electro-optic assembly includes a first partially reflective, partially transmissive substrate 12 defining a first surface 16 and a second surface 18. A second partially reflective, partially transmissive substrate 14 defines a third surface 20 and a fourth surface 21. A cavity 28 is defined between the first substrate 12 and the second substrate 14. A seal 23 is disposed about a perimeter of the first and second substrates 12, 14. An electro-optic material 24 is disposed between the second surface 18 of the first substrate 12 and the third surface 20 of the second substrate 14. The electro-optic assembly 10 is operable to change at least one of reflectance and transmittance states in either a discrete or continuous manner. A transparent electrode coating 25 is disposed on at least one of the second surface 18 and the third surface 20. The transparent electrode coating 25 includes an IMI structure. The reflectance off of the transparent electrode coating 25 is less than about 2%.

In at least one embodiment, the electro-optic assembly 10 is configured to have a non-varying reflectance and a varying transmittance. The "clear state" refers to the condition of maximum transmittance. The activation of the electro-optic media, such as an electrochromic or liquid crystal media, will reduce the transmittance of the electro-optic assembly 10 to a "darkened state." The "low end" transmittance refers to the minimum transmittance attainable by the electro-optic assembly 10. The first and second substrates 12, 14 can be positioned in a parallel spaced-apart relationship and can have the seal 23 substantially around the perimeter of the first and second substrates 12, 14. The first substrate 12 and the second substrate 14 define the cavity 28, wherein an electro-optic material 24, such as an electrochromic (EC) or liquid crystal medium, is disposed between the first and second substrates 12, 14.

Figure 2:
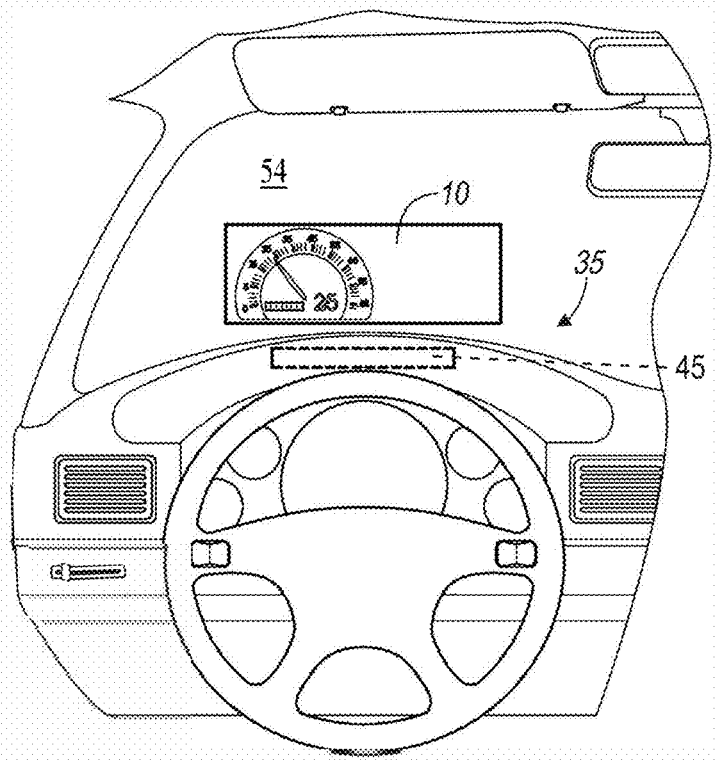
FIG. 2 is another front perspective view of a heads up display system incorporating an electro-optic assembly of the present disclosure.

By way of explanation and not limitation, the electro-optic assembly 10 can be included in a heads up display (HUD) system 35. The electro-optic assembly 10 can be controlled to vary the amount of light transmission based on input from a control circuit. In this embodiment, an electrochromic media is often selected due to its gray-state capability. For example, in daylight conditions the electro-optic assembly 10 may be darkened to improve or increase the contrast ratio, which is the ratio of reflected display light to transmitted ambient light, and allow for improved visibility of information projected on the electro-optic assembly 10 that is provided from the heads up display system 35. In addition, the heads up display system 35 may take on a variety of constructions. For example, the heads up display system 35 may include a display extending upwardly from a vehicle dash (FIG. 1), or may include a display generally isolated in or on a forward windscreen (FIG. 2).

In regards to heads up display systems 35, the image projected onto the electro-optic assembly 10 should be bright enough to see in any condition. This is particularly challenging when the lighting outside the vehicle is bright. The contrast between the light from the projector 45 and the lighting behind the electro-optic assembly 10 can be low on a bright sunny day. While a brighter, more intense lighting source (e.g., the projector 45) improves the contrast, increasing the display brightness may not be the most economical solution and a display that is bright enough to provide reasonable contrast in very bright daylight conditions will be too bright in other conditions. Although controls may be used to deal with variations in brightness, the specific background is ever changing in a moving vehicle, and depends in part on the position of the driver's eyes. In accordance with one example, the electro-optic assembly 10 can be configured to lower the transmission and/or to increase the contrast ratio.

Depending on the application, there may be a need for a higher or lower transmittance in the clear state, different reflectance values for optimal contrast ratios, and/or broader dynamic range of the transmittance levels. The initial reflectance and range of transmittance properties is further complicated by the capabilities of the projector 45 employed with the heads up display system 35 and the light output capabilities of the projector 45 along with the light transmittance levels for a windscreen 54. The windscreen 54 will have a direct impact on the contrast ratio and visibility of the image from the heads up display system 35. There are a number of factors which affect the transmittance levels of the windscreen 54. The minimum light transmittance is based on the rules in the location in which the vehicle is sold but higher transmittance levels may be present based on how the vehicle is equipped and marketed. This range of factors creates the need for solutions which can be adapted to different vehicle and environmental conditions.

Another aspect that should be considered when utilizing the heads up display system 35 is a secondary reflection from the first through fourth surfaces 16, 18, 20, 21 of the first and second substrates 12, 14. Reflection off of the first through fourth surfaces 16, 18, 20, 21 may create a double image effect from secondary reflections that do not perfectly align with the primary reflected image (e.g., due to geometries of the components of the electro-optic assembly). The double image that may be formed from secondary reflections off of the first through fourth surfaces 16, 18, 20, 21 may cause the primary image projected by the projector 45 and reflected by the electro-optic assembly 10 to appear blurry or unclear.

According to one example, the electro-optic assembly 10 can be assembled using two approximately 1.6 mm glass substrates (e.g., the first and second substrates 12, 14) which are both bent with a spherical radius of approximately 1250 mm. Other thicknesses for the first and second substrates 12, 14. In other examples the first and second substrates 12, 14 may be bent to have a "free-form" shape. The desired shape is one in which the resultant primary reflected image "appears" to be forward of the electro-optic assembly 10 and forward of the vehicle. The exact surface contour needed to attain this characteristic is a function of the properties of the projector 45, projector 45 and driver location, as well as the electro-optic assembly 10 location relative to the other two locations. Having the image projected forward of the vehicle allows the driver to obtain the desired information without having to change their focal distance. In a traditional heads up display located within the vehicle, the driver's eyes often have to refocus to the shorter viewing distance thus decreasing the time spent viewing the road. Furthermore, the driver's eyes will also then have to re-focus on the road ahead, which further decreases the time spent viewing the road and forward conditions. The shape of the electro-optic assembly 10 should also be selected so as to preserve the basic characteristics of the projected image (i.e., straight lines remain straight, aspect ratios of images are preserved, etc.).

Referring now to FIG. 2, the first substrate 12 includes the first surface 16 and the second surface 18. The second surface 18 can be coated with indium tin oxide with a sheet resistance of approximately 12 ohms/sq. The first surface 16 can be concave and can be coated with chromium (Cr). The coated first substrate 12 may have a transmission of approximately 37.8% and reflectance of approximately 25.4%. The second substrate 14 defines the third and fourth surfaces 20, 21. The third surface 20 can be coated with indium tin oxide with a sheet resistance of approximately 12 ohms/sq.

From the first surface 16, the electro-optic assembly 10 can have a clear state reflectance of approximately 25% and a transmittance of approximately 24%. The electro-optic assembly 10 can have a low end, or state, transmittance of approximately 10.5%. Alternatively, in other examples, the high end, or state, transmittance of the electro-optic assembly 10 may be greater than 45% or even 60%. The characteristics of the electro-optic assembly 10 may also be altered so that the low end transmittance is less than 7.5% or even less than 5% in the darkened state. In some examples, transmittance levels down to 2.5% or less may be desirable. Increasing the high-end transmittance may be obtained by the use of coatings and materials which have low absorption, as will be described herein. Lower low-end transmittances may be obtained through the inclusion of materials which have higher absorption. If a wide dynamic range is desired, then low absorption materials may be used in combination with electro-optic materials and cell spacings (e.g., the space between the first and second substrates 12, 14) which attain higher absorbance in the activated state. Those skilled in the art will recognize that there exists a multitude of combinations of coatings and electro-optic materials, cell spacings and coating conductivity levels which can be selected to attain particular device characteristics.

To provide electric current to the first and second substrates 12, 14 and electro-optic material 24, electrical elements may be provided on opposing sides of the first and second substrates 12, 14 (e.g., the second and third surfaces 18, 20) to generate an electrical potential therebetween. In one example, a J-clip may be electrically engaged with each electrical element, and element wires extend from the J-clips to a primary printed circuit board. To provide the greatest surface area through the electro-optic assembly 10, the contacts are located along one side of the device. In this example, there is a back plate and top plate offset to allow contact such as a bus clip. Other contact designs are possible including the use of conductive ink or epoxy.

According to various examples, the electro-optic material 24 may be an electrochromic medium. In electrochromic examples, the electro-optic material 24 may include at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES," U.S. Patent Application Publication No. 2002/0015214 A1 entitled "ELECTROCHROMIC DEVICE," now U.S. Pat. No. 6,519,072, and International Patent Application Serial Nos. PCT/US98/05570 entitled "ELECTROCHROMIC POLYMERIC SOLID FILMS, MANUFACTURING ELECTRO- CHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. The first and second substrates 12, 14 are not limited to glass elements but may also be any other element having partially reflective, partially transmissive properties.

According to various examples, a perimeter band of the electro-optic assembly 10 can be modified by adding or removing material to block or obscure the view of a seal 23 and contact materials. In a first example, an outside perimeter of the first and fourth surfaces 16, 21 can be etched to provide substrates with a frosted perimeter. In frosted perimeter examples, the perimeter band is formed by damaging both the first and fourth surfaces 16, 21 using a $CO_2$ laser to form a frosted band approximately 4 mm wide. Additionally or alternatively, edges of the first and fourth surfaces 16, 21 can be ground and/or polished. Further, a spectral filter material (e.g., a chrome or metal ring) or light scattering material may be added to the perimeter of the first and/or second substrates 12, 14 (e.g., any of the first through fourth surfaces 16, 18, 20, 21) to aid in concealing the seal 23. The spectral filter can block the view of the seal 23 and also provides ultraviolet (UV) protection for the seal 23. In another example of the spectral filter, chromium oxynitride, or another dark coating, may be deposited on the perimeter of the electro-optic assembly 10 to create a dark ring which acts as the spectral filter. The spectral filter material may be selectively deposited, or may be deposited over the entire surface and then selectively removed, to create the perimeter band, such as with selective laser ablation. Additionally or alternatively, the seal 23 may be generally clear, colorless, or configured to scatter light. In such examples, the frosted band can extend slightly inboard of the seal 23. It will be understood that any of the above described techniques of concealing the seal 23 may be used alone, or in conjunction with, any of the other disclosed concealment techniques for the seal 23.

In the depicted example, each of the first and second substrates 12, 14 include a rounded edge 62 and a contact edge 66 that is not rounded. The non-rounded contact edge 66 may be desirable for ease of contact, and if the device is supported by that edge, there would be no need to round the first and second substrates 12, 14 along the contact edge 66. Any exposed edge on the electro-optic assembly 10 may be generally rounded. The radius of curvature of the rounded edges 62 may be greater than approximately 2.5 mm.

Figure 1A:
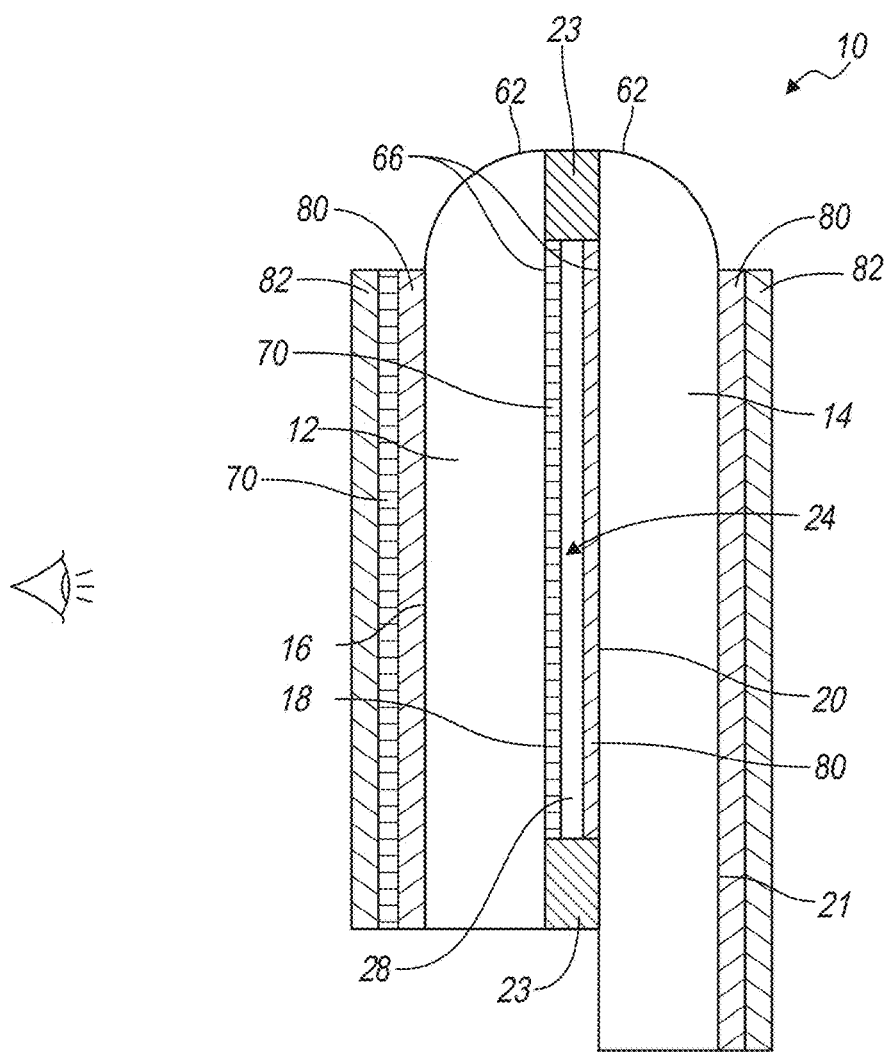
FIG. 1A is a schematic cross-sectional view of the electro-optic assembly of FIG. 1.

With reference again to FIG. 1A, the electro-optic assembly 10 may include a transflective coating 70, an anti-reflection coating 80, and a scratch-resistant coating In the depicted example, the transflective coating 70 is positioned proximate the first surface 16, but may additionally or alternatively be positioned on the second surface 18 without departing from the teachings provided herein. In the depicted example, the anti-reflection coating 80 is on the first, third and fourth surfaces 16, 20, 21, but it will be understood that the anti-reflection coating 80 may additionally or alternatively be positioned on the second surface 18 without departing from the teachings provided herein. In some examples, the anti-reflection coating 80 is positioned on at least one of the first and second surfaces 16, 18, and may be positioned on whichever of the first and second surfaces 16, 18 is opposite the surface onto which the transflective coating 70 is positioned. The anti-reflection coatings on the first and third surfaces 16, 20, in certain examples, function as electrodes (e.g., an antireflective electrode) to enable darkening of electro-optic material 24. It will be understood, that when transflective coating 70 is located on the second surface 18, in certain examples, it may also serve a dual purpose and also act as an electrode. In the depicted example, the scratch-resistant coating 82 is positioned proximate the first and fourth surfaces 16, 21. It will be understood that although described as separate layers, the transflective coating 70, the anti-reflection coating 80 and/or the scratch-resistant coating 82 may share properties which function as the other coatings, as described in greater detail herein.

Even though the example of the transflective coating 70 having a dielectric-metal bilayer provides a higher range of attainable values for reflectance and transmission than a single metallic layer, it still may be a challenge to tune the refractive index and absorption of the materials to achieve a particular reflectance and transmission level. Therefore, it may be advantageous to have a transflective coating 70 that allows more flexibility in terms of reflectance and transmittance values, especially when lower transmittance values are sought. Accordingly, in another example of the transflective coating 70, such characteristics can be obtained with a multi-layer coating such as a metal/dielectric/metal structure (MDM). Generally, an M-layer of the MDM coating includes one or more of chromium, molybdenum, nickel, Inconel, indium, palladium, osmium, tungsten, rhenium, iridium, rhodium, ruthenium, stainless steel, tantalum, titanium, copper, gold, platinum, any other platinum group metals, zirconium, vanadium AlSi alloys, and alloys and/or combinations thereof. It will be understood that any of the aforementioned metals may be utilized for the single or bilayer examples of the transflective coating 70. In some examples, combinations of metals and dielectric materials may depend on whether the transflective coating 70 is configured on the first surface 16 or the second surface 18 for durability or electrode properties. The dielectric material may be selected from one or more of the following: ITO, $SnO_2$, SiN, $MgF_2$, $SiO_2$, $TiO_2$, $F:SnO_2$, $NbO_x$, $TaO_x$, indium zinc oxide, aluminum zinc oxide, zinc oxide, electrically conductive $TiO_2$, $CeO_x$, ZnS, chromium oxide, $ZrO_x$, $WO_3$, nickel oxide, $IrO_2$, $NiO_x$, $CrO_x$, $NbO_x$, and $ZrO_x$, or other material with a refractive index between about 1.37 and about 4. It will be understood that any of the aforementioned dielectrics may be utilized for the bilayer example of the transflective coating 70.

The electro-optic assembly 10 may be configured into two options which are differentiated by the location of the principle transflector layer. The surfaces without the principle transflector are referred to as the secondary surfaces. The electro-optic assembly 10 is differentiated from other electrochromic devices, such as mirror assemblies, in that the reflectance is substantially fixed, while for auto dimming mirrors, the reflectance is variable. The electrochromic media is present behind a fixed reflectance principle transflector coating, which can be positioned at either the first surface 16 or the second surface 18, and therefore the electrochromic media will not attenuate the reflectance of the principle transflector. The reflectance of the principle transflector coating, ideally, is the only reflectance desired. Without properly designed coatings the reflectance off of the secondary surfaces will be relatively high. The potential for significant reflectance off of the secondary surfaces may therefore cause double image. Coatings may be applied to the secondary surfaces to reduce the reflectance off of the surfaces and thus reduce the potential for double image. The Double Image Ratio (DIR), described herein, defines conditions wherein objectionable double image may be avoided. The DIR can be quantified by calculating the ratio, or DIR of the reflectance off of the principle transflector to the net reflectance off of each of the secondary surfaces or DIR=principle transflector reflectance/secondary surface net reflectance. With this metric, electro-optic assemblies with higher DIR will have less double image.

According to an embodiment, the electro-optic assembly 10 can be assembled using the two approximately 1.6 mm glass substrates 12, 14 which are both bent with a spherical radius of approximately 1250 mm. Other substrate thicknesses are also viable and their use is within the scope of this disclosure. In other embodiments the substrates 12, 14 may be bent to have a so-called "free-form" shape. The desired shape is one in which the resultant reflected image "appears" to be forward of the combiner surface and forward of the vehicle. The exact surface contour needed to attain this characteristic is a function of the projector properties, projector and driver location, as well as the combiner location relative to the other two locations. Having the image projected forward of the vehicle allows the driver to obtain the desired information without having to change the focal distance. In a traditional display located within the vehicle, the driver's eyes often have to refocus to the shorter viewing distance thus decreasing the time spent viewing the road. Furthermore, the driver's eyes will also then have to re-focus on the road ahead, which further decreases the time spent viewing the road and forward conditions. The shape of the combiner should also be selected so as to preserve the basic characteristics of the projected image, i.e., straight lines remain straight, aspect ratios of images are preserved, etc.

The electro-optic assembly 10 may be configured into two options which are differentiated by the location of the principle transflector layer. The surfaces without the principle transflector are referred to as the secondary surfaces. The electro-optic assembly 10 is differentiated from other electro-optic devices, such as mirror assemblies, in that the reflectance is substantially fixed while for auto dimming mirrors the reflectance is variable. The electro-optic media is present behind a fixed reflectance principle transflector coating which can be positioned at either surface 16 or 18 and therefore the electro-optic media will not attenuate the reflectance of the principle transflector. The reflectance of the principle transflector coating, ideally, is the only reflectance desired. Without properly designed coatings the reflectance off of the secondary surfaces will be relatively high. The potential for significant reflectance off of the secondary surfaces may therefore cause double image. Coatings may be applied to the secondary surfaces to reduce the reflectance off of the surfaces and thus reduce the potential for double image. The Double Image Ratio (DIR) defines conditions wherein objectionable double image may be avoided. A low reflectance electrode, as describe in more detail below, is therefore needed.

Figure 3A:
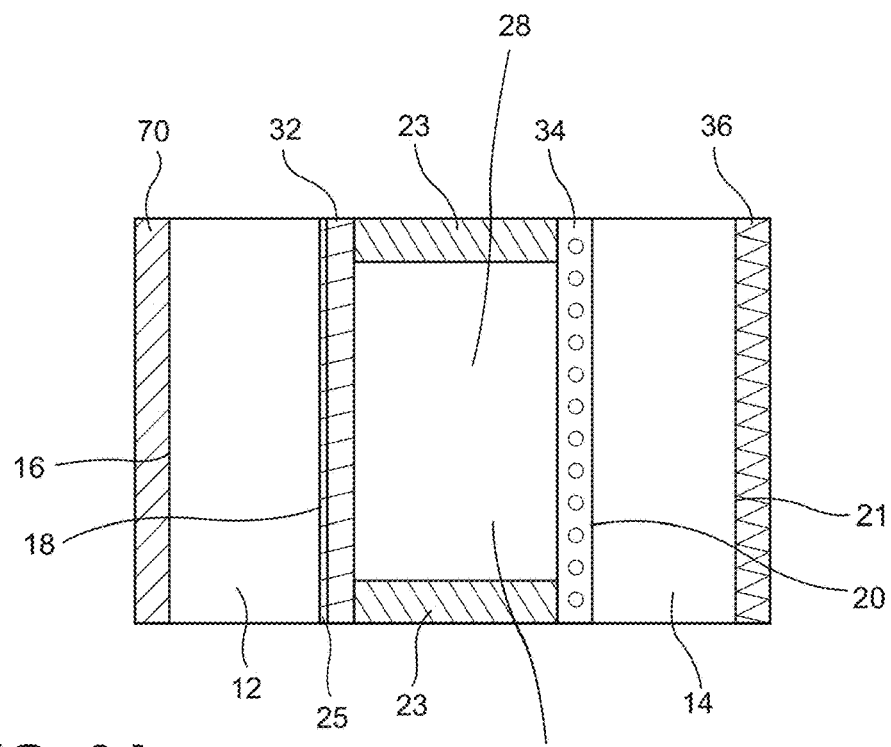
FIG. 3A is a schematic side cross-sectional view of one configuration of a transflective coating on a transparent electrode of the present disclosure.
Figure 3B:
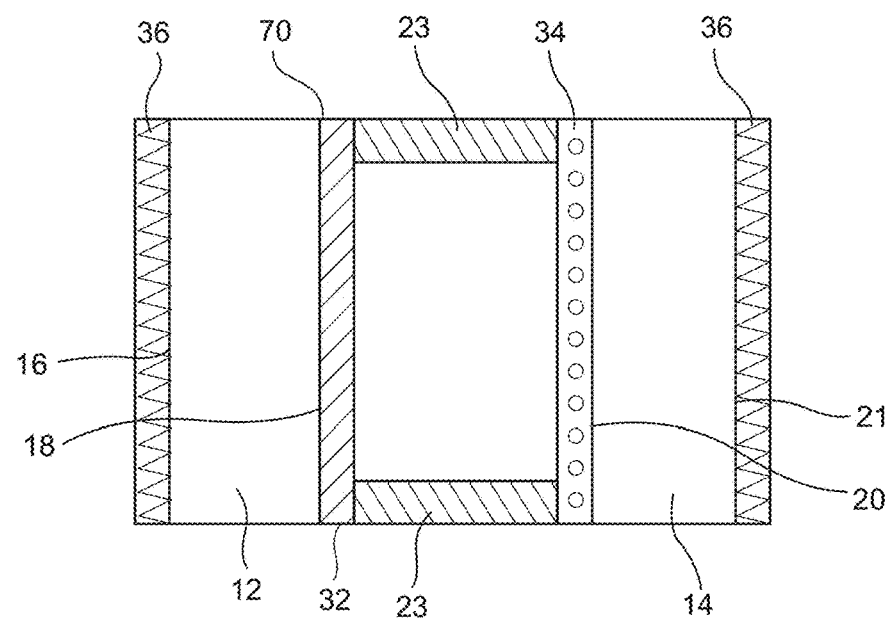
FIG. 3B is a schematic side cross-sectional view of another configuration of a transflective coating on a transparent electrode of the present disclosure.

In an alternate arrangement for a HUD configuration, the low reflectance electrodes can be configured as described in FIGS. 3A and 3B. FIG. 3A shows the first configuration wherein a transflective coating 70 is on the first surface 16. A transparent electrode 32 is present on the second surface 18 and a transparent electrode 34 is present on the third surface 20. An anti-reflection coating 36 is present on the fourth surface 21.

With reference now to FIG. 3B, another arrangement is illustrated that shows the second configuration wherein the transflective coating 70 is on the second surface 18. The anti-reflection coating 36 is present on the first surface 16. The transparent electrode 34 is present on the third surface 20. The anti-reflection coating 36 is present on the fourth surface 21. The functionality and options for the low-reflectance transparent electrode, which optionally, has acceptable DIR, will be detailed below.

In another non-limiting embodiment, a switchable mirror 15, such as described in U.S. Pat. Nos. 9,057,875 and 8,879,139; U.S. Patent Application Publication Nos. 2016/0001706 and 2015/0085337; and Provisional Patent Application Nos. 61/881,624; 61/764,341; and 61/637,527, may benefit from the use of low reflectance electrodes to eliminate ghost images. Ghost images are residual reflected images which compete against a display image and which may, therefore, be objectionable.

Figure 4:
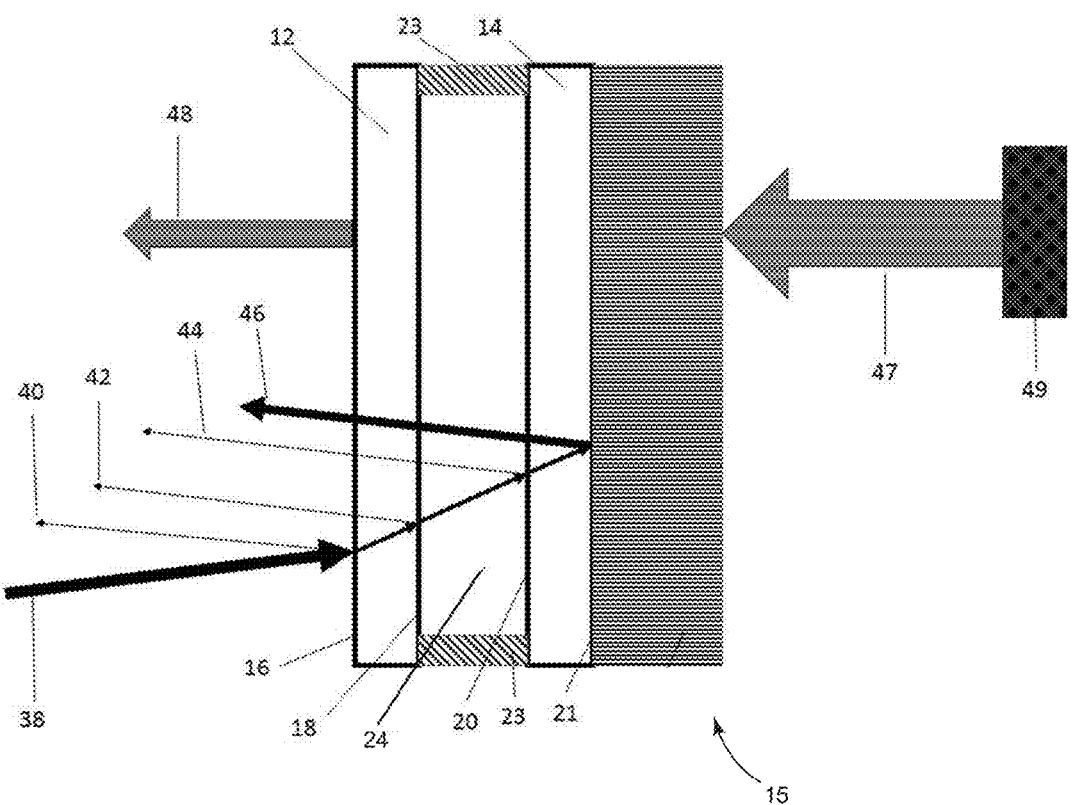
FIG. 4 is a schematic side cross-sectional view of a heads up display of the present disclosure.

With reference now to FIG. 4, substrates 12 and 14 are bonded together with a seal 23 to form a chamber which contains electro-optic material 24. The incident light is reflected off of the first surface 16 with reflected beam 40, off of the second surface 18 with reflected beam 42, off of the third surface 20 with reflected beam 44 and off of the fourth surface 21 with reflected beam 46. Alternatively, reflected beam 46 may be reflected from the switchable mirror 15. The switchable mirror 15 may be operated in at least two states, a high reflectance and a low reflectance state. When the switchable mirror 15 is in the low reflectance state, the principle reflectance(s) may originate from any or all of surfaces 16, 18 or 20 and any of reflected beams 40, 42 or 44 may therefore cause ghost images. The reflected ghost images will then compete with light 47 originating from a display 49. After passing through the electro-optic assembly 10 the display light 47 may be attenuated such that resultant light 48 has a lower intensity. If the light is relatively intense then the brightness of the ghost images from reflected beams 40, 42 and 44 may themselves be bright enough to degrade the visibility of display beam 48. The anti-reflection coating 36 may be applied to the surface 16 to mitigate the ghost image coming off of that surface. The surfaces 18 and 20 of the electro-optic device have transparent electrodes on them. For minimization or elimination of ghost images, the transparent electrodes should have low reflectance.

Figure 5:
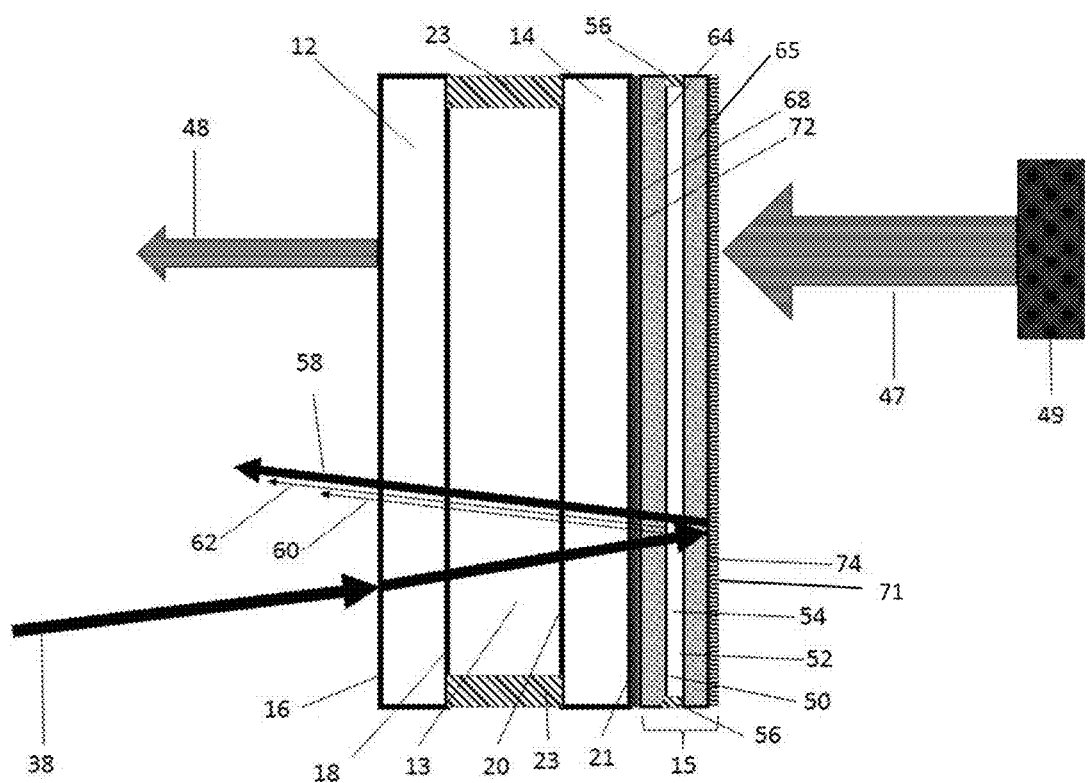
FIG. 5 is another schematic side cross-sectional view of a heads up display of the present disclosure.

In another non-limiting embodiment, the FIG. 5 below shows the details of the switchable mirror 15. The reflectances off of the electro-optic forward element as described above are omitted from the drawing for clarity purposes. The switchable mirror 15 has a first substrate 64 and a second substrate 65. The two substrates are held in a parallel configuration with a seal 56 around the perimeter to form a chamber. The chamber is filled with liquid crystal material to form a liquid crystal cell. The principle reflectance is generated by a reflective polarizer 71 which is rearward of the liquid crystal cell. The reflective polarizer 71 may be positioned behind the electro-optic element or it may be bonded directly to the electro-optic element using an adhesive layer 68. The first substrate has a first surface 72 and a second surface 50. The second substrate has a third surface 52 and a fourth surface 74. The adhesive layer 68 may be selected to have a comparable refractive index to substrates 64 and 14 which will result in practical elimination of the reflectance of these interfaces. The reflectance off of surface 74 will be dominated by the reflectance of reflective polarizer 71. Surfaces 50 and 52 will have transparent electrodes for activating the liquid crystal portion of the switchable mirror 15. As with the example above, light will reflect off of the different interfaces. Reflected beam 58 is from the reflective polarizer 71 while reflected beams 60 and 62 are from surfaces 50 and 52, respectively. The liquid crystal may be configured either to allow light from the reflective polarizer 71 to be present in the on or off state. Regardless of the selected operational state, the reflectance off of surfaces 50 and 52 have the potential for forming ghost images. In particular, when the reflectance from the reflective polarizer 71 is "off" or not present, then the reflectance off of surface 50 would be more likely to form a ghost image relative to surface 52. The operation of a liquid crystal device is enabled by applying an electric field to align the liquid crystal molecules. This function can be performed by having electrodes comprising transparent conductive oxides, such as indium tin oxide (ITO), which are less than a half wave optical thickness and often less than a quarter wave optical thickness. Layers of a transparent conductive oxide (TCO) in this thickness range can result in relatively high reflectance values due to interference effects. Therefore, the liquid crystal component of an electro-optic switchable mirror may be prone to ghost images and more prone compared to the electro-optic portion of the device.

These three non-limiting examples demonstrate the need for low reflectance electrodes. A novel coating structure has been developed, herein referred to as an IMI, which is adaptable to these product needs, the features and construction of which will be detailed below.

Figure 6:
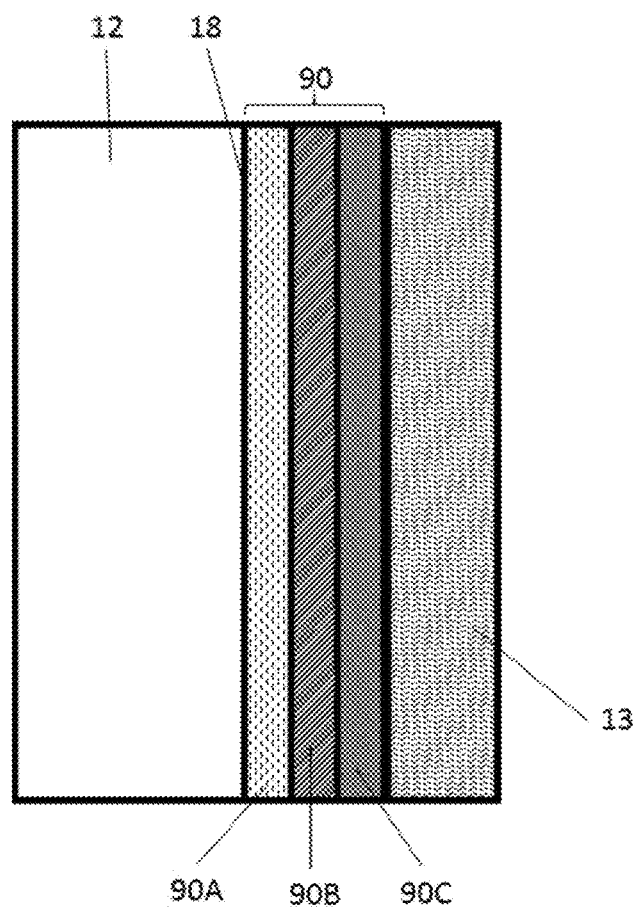
FIG. 6 is a schematic side cross-sectional view of an IMI structure of the present disclosure.

The FIG. 6 below shows one substrate having an IMI structure (coating) of the present disclosure. The IMI coating 90 comprises three sub-layers 90A, 90B, and 90C. Layers 90A and 90C are "insulator" layers or "I" in the IMI stack while 90B is a "metal" layer or "M" in the IMI stack. The IMI coating 90 is shown on surface 18 of substrate 12 but it is understood that the IMI coating 90 may be located on other surfaces of the electro-optic device which would benefit from a low reflectance transparent electrode. Also in FIG. 6, the electro-optic material 13, which may be an electrochromic material, is adjacent to the IMI coating 90 opposite glass substrate 12. The electrochromic material 13 may be replaced with a liquid crystal material or other electro active material without deviating from the spirit of the disclosure. It should also be understood that the IMI coating 90 is depicted in FIG. 6 as a three-layer coating for illustrative purposes. It is understood that other layers may be added to this basic structure while still maintaining the spirit of the disclosure. For example, in the case of an electrochromic media next to the IMI coating, it may be desirable to exchange either electrons and/or holes into and out of the IMI surface to enable the state change in the electrochromic media. The presence of a transparent conducting oxide as the layer adjacent to the electrochromic media will then be valuable in these embodiments. The top insulator layer may then be further sub-divided wherein an alternate material or materials may comprise the balance of the thickness. Examples of other additional materials and sub-layers will be described below.

The IMI coating 90 comprises the metal layer 90B which may comprise silver, gold, copper, aluminum or alloys of silver, aluminum, or gold which may include one or more of the following elements: silver, gold, palladium, platinum, rhodium, titanium, aluminum, Zinc, copper, tin, Silicon, Germanium, Manganese, Magnesium, tungsten, Lead, Boron, Chrome, Thorium, Tantalum, Lithium and Indium. The metal layer 90B is characterized by a low real part of the refractive index, n, and a high imaginary part of the refractive index, k. The n parameter is less than about 1, or less than about 0.5 or less than about 0.2. The k parameter is greater than 2, or greater than 2.5 or greater than 3. The IMI coating 90 also comprises the insulator layers 90A and 90C which may be selected from the group comprising dielectric and transparent conducting oxides. Example materials include: ITO, F:SnO2, Sb:SnO2, Doped ZnO such as Al:ZnO, Ga:ZnO, B:ZnO, IZO, Nb:TiO$_2$, SnO$_2$, SiN, MgF$_2$, SiO$_2$, TiO$_2$, NbO$_x$, TaOx, zinc oxide, CeOx, ZnS, chromium oxide, ZrO$_x$, WO$_3$, nickel oxide, IrO$_2$, NiO$_x$, CrO$_x$, NbO$_x$, Al$_2$O$_3$, and ZrO$_x$, or other material with a refractive index between about 1.37 and about 4. Layers 90A and 90B may have a real part of the refractive index between about 1.2 and about 4, or 1.3 and 3, or 1.45 and 2.5. The imaginary part of the refractive index may be less than about 0.2, or less than 0.05 or less than 0.025. The selection of materials with these properties, along with specific thicknesses of the layers, enable the IMI coating 90 to attain low reflectance with a range of sheet resistance values and/or low absorption.

Figure 7:
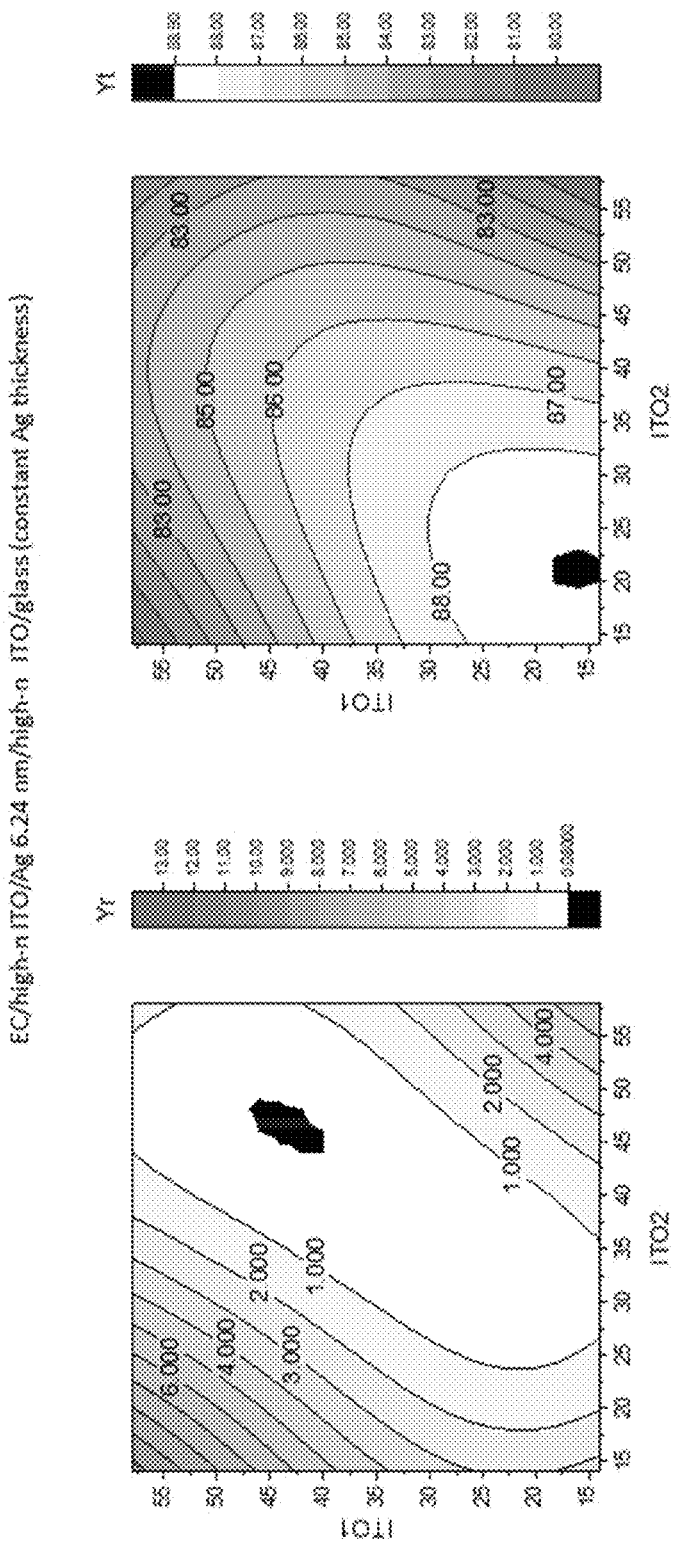
FIG. 7 illustrates two calculated contour plots, one for reflectance and one for transmittance.

IMI coatings are known in the art for transparent electrodes for electro-optic devices. The new problem to be solved, wherein low reflectance is desired, introduces a new design constraint which led to novel IMI coatings described herein. In other applications, attaining high transmittance for IMI coatings can lead to layer combinations which may be counter to the need for low reflectance. As illustrated in FIG. 7 below contains two calculated contour plots one for reflectance and one for transmittance. The horizontal axes show the thickness of the insulator layer 90C, a high index ITO layer while the vertical axes show the thickness of the insulator layer 90A, also a high index ITO layer. The metal layer 90B is silver at a fixed thickness of 6.24 nm. The different combinations of thickness for the ITO layers 90A and 90C leads to different transmittance and reflectance values. These calculated values use glass as a substrate with a refractive index of 1.52 and an electrochromic media with a refractive index of 1.44. The transmittance contour plot on the right shows that the thickness combination for the two ITO layers attains maximum transmittance at about 16 nm for the first ITO and about 22 nm for the second ITO. In contrast, the minimum reflectance is attained with a first ITO layer with a thickness of about 42 nm and a second ITO layer with a thickness of about 45 nm. This clearly demonstrates that the solutions to previous problems, such as the need for high transmittance, does not equate to solutions to the new problem of low reflectance. The reflectance plot shows that reflectance values of 2% or less is attainable, or less than 1%, and even reflectance values below 0.08% is demonstrated. Reflectance values less than 0.5% or less than 0.25% or less than 0.10% are also attainable and, depending on the application, may also be desirable. In FIG. 7, the reflectance refers to the eye-weighted CIE Y reflectance. Alternatively, the reflectance may be a simple average of a given wavelength range such as 400 to 720 nm or a reflectance intensity over a given wavelength range normalized to the intensity versus wavelength for a particular light source. The reflectance targets may be selected from one or more of these options.

The examples shown herein are optimized for the embodiment where the refractive index of the two media adjacent on either side of the IMI are similar. It is understood by those skilled in the art that similar low reflectance values may be obtained when there is a mismatch between the refractive indices of the two adjacent media. The difference in index between the two media may be less than about 0.35, or less than about 0.2, or less than 0.1.

Different applications, such as electro-optic devices or liquid crystal devices, have different constraints in relation to sheet resistance or conductivity of the transparent electrode. Electro-optic materials rely on relatively large current flow to function optimally while liquid crystal devices, being field effect devices, have less stringent needs from a sheet resistance perspective. Therefore, electro-optic devices function well with low sheet resistance but liquid crystals may function with higher sheet resistance for the transparent electrodes.

Figure 8:
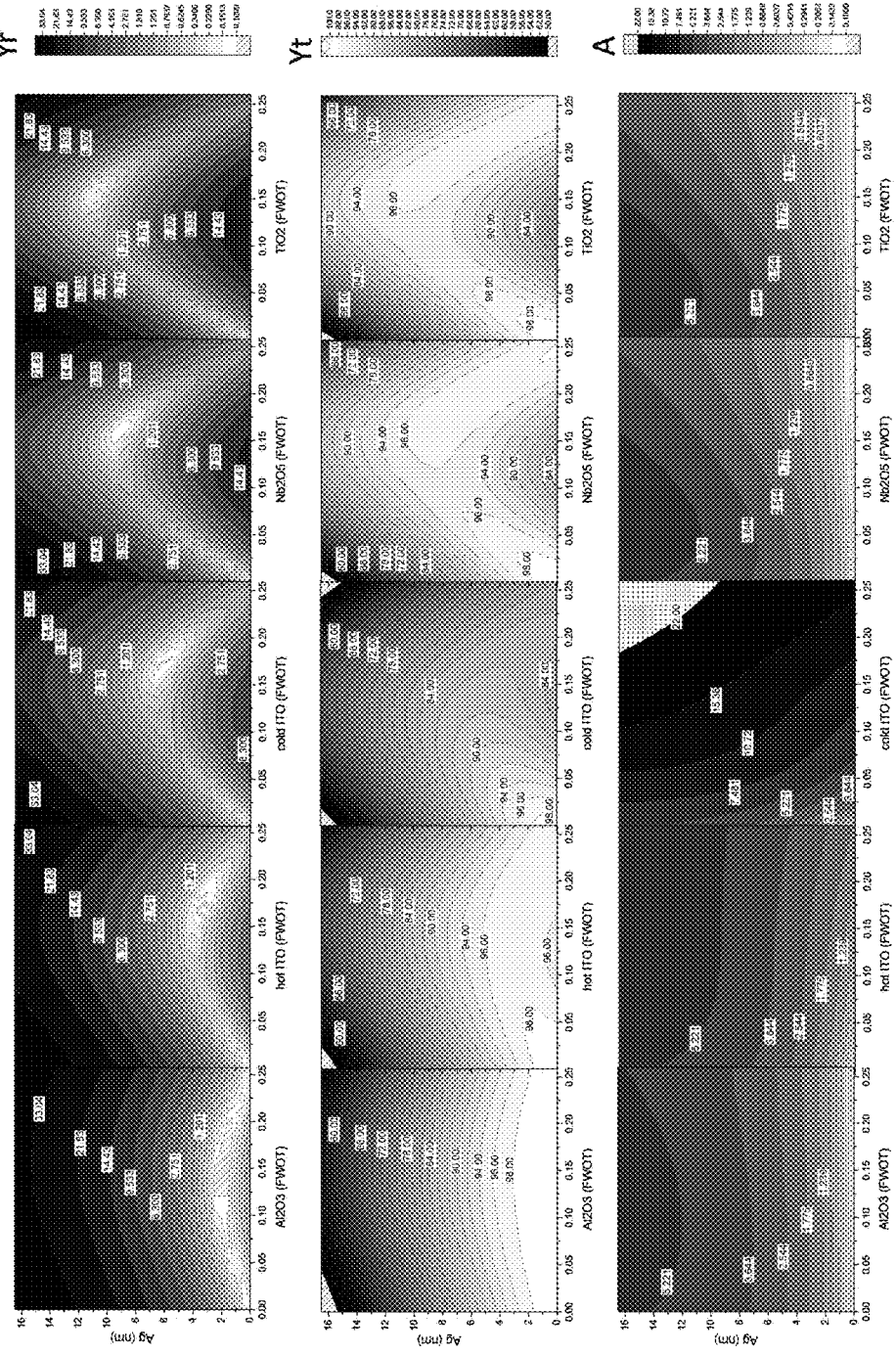
FIG. 8 illustrates the reflectance, $Y_r$, transmittance, $Y_t$, and Absorption, A, for different IMI structures of the present disclosure.

With reference now to FIG. 8, the reflectance, Yr, transmittance, Yt, and Absorption, A (100%-Yr-Yt) for different IMI designs. The series of calculated designs shown in the sub-graphs contrast the attribute (Yr, Yt, or A) as a function of the thickness of the silver layer in the IMI stack and the thickness of the I layer in fraction of a full wave optical thickness (FWOT). The different sub-graphs use different materials for the insulator layer. The first column uses Al2O3 (n=1.68), the second column uses a hot ITO (n=1.82), the third uses a cold ITO (n=2.05), the fourth uses Nb2O3 (n=2.2) and the fifth column uses TiO2 (n=2.5). These materials were selected because they have different refractive indices. In these examples, the thickness of both insulator layers is maintained symmetrical on either side of the silver layer. The values at the top of each column represent the silver thickness which corresponds to the reflectance minimum for that particular I value. The unexpected discovery is that the silver thickness correlates with the refractive index of the insulator layer.

Figure 9:
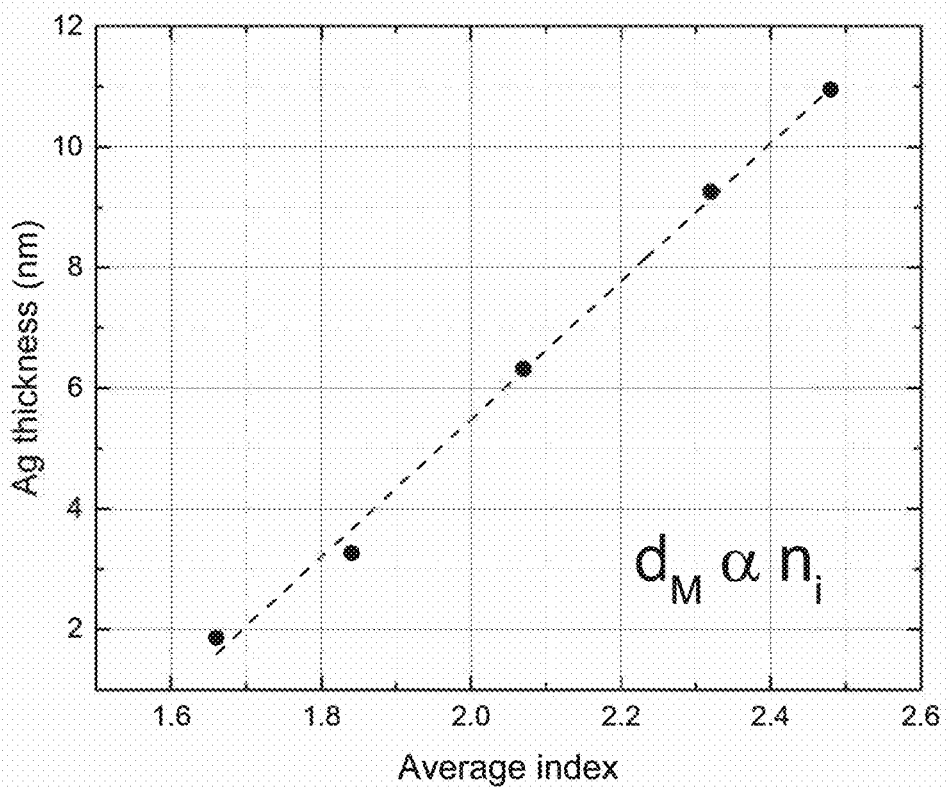
FIG. 9 is a graph illustrating the silver thickness versus the refractive index of the insulator layers of the present disclosure.

As illustrated in FIG. 9, the optimal silver thickness for the minimal reflectance can be determined based on the refractive indices of the insulator layers. The minimal reflectance will occur when the following relationship is met: equation 1: silver thickness=−17.4 nm+11.44*refractive index of the insulator layer. In principle, the sheet resistance can be determined which leads to the thickness of the silver layer. This in turn can be used to calculate the refractive index needed for the insulator layers. It is understood by those skilled in the art that the conductivity of the silver layer will vary with deposition conditions, materials used in the IMI stack and other processing conditions. Therefore, it is further understood that some experimental optimization may be needed around the values predicted with this equation and are within the scope and teachings of this disclosure. The thickness of the silver or metal in this embodiment is approximated by equation 1 above wherein approximately is understood that the thickness may vary from this equation by up to +/−2 nm.

Figure 10:
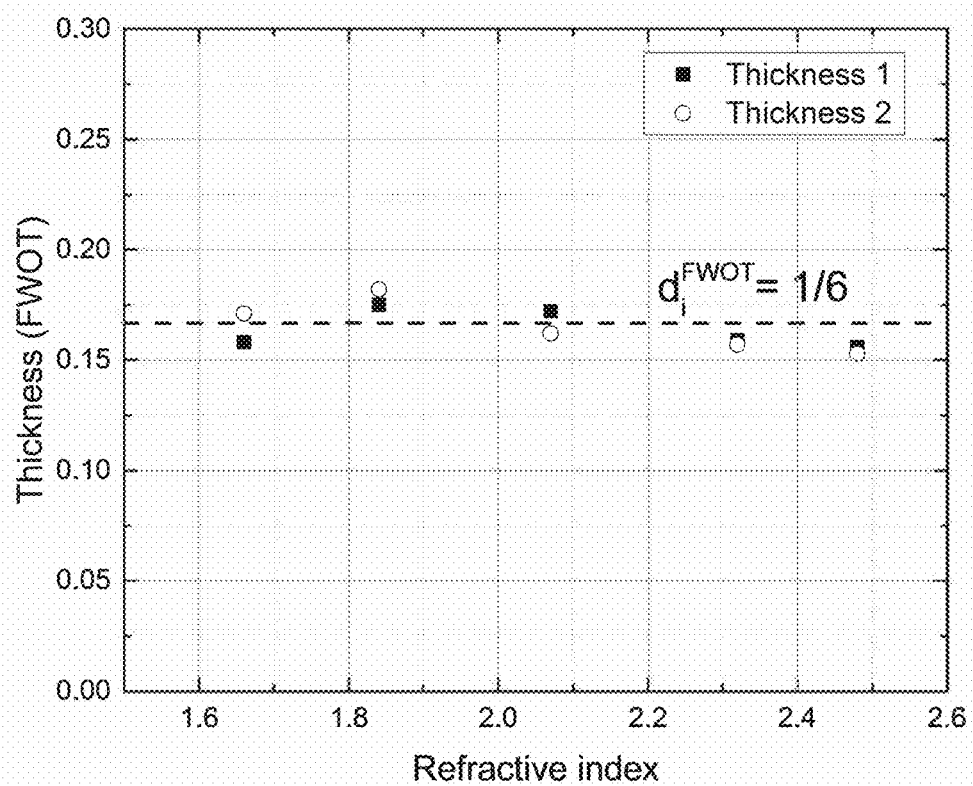
FIG. 10 is a graph illustrating the optical thickness of the insulator layers versus the refractive index of the insulator layers.

Additionally, it was further unexpectedly discovered, that for the case of symmetric layers on either side of the silver layer, thickness and refractive index, that the minimum reflectance occurs when the optical thickness of the insulator layers is approximately ⅙$^{th}$ of a FWOT. FIG. 10 illustrates a graph of optical thickness of the insulator layers versus the refractive index of the insulator layers. The optical thickness of the insulator layers for this embodiment may be between about ⅛$^{th}$ and ⅕$^{th}$ optical thickness.

The bottom row of FIG. 8 demonstrates the absorption of the IMI coating for the different insulator layers. In each graph the absorption tends to increase with the thickness of the silver layer. Another general trend is that lower absorption may be obtained for thin silver layers with increasing refractive index, n, of the insulator layers. The center graph is for the case where the insulator layer, cold ITO in this case, has a relatively high k value–0.1@550 nm. The higher k value does not diminish the IMI stack's ability to attain low reflectance but it does impact the net absorption of the stack. In the embodiment where both low reflectance and low absorption is desired, the k value of the insulator layer should be less than about 0.05 and in some instances less than about 0.025. In embodiments where both low absorption and low reflectance is desired, the absorption of the IMI stack may be less than about 10%, or less than about 7.5%, or less than about 5%.

The transmittance of the different IMI structures is shown in the middle row of FIG. 8. The transmittance for the lower refractive index insulators tends to be relatively unchanging with optical thickness of the insulator while it may be more likely that with high refractive index insulators, there may be relative optimums in the transmittance. The transmittance of the IMI coating may be greater than 80%, or greater than 90% or even greater than 95%. It is understood that these general trends will hold with different materials that have different refractive indices and that local optimizations may be used to balance the desired sheet resistance, reflectance, absorption, and transmittance for a given application.

Figure 13:
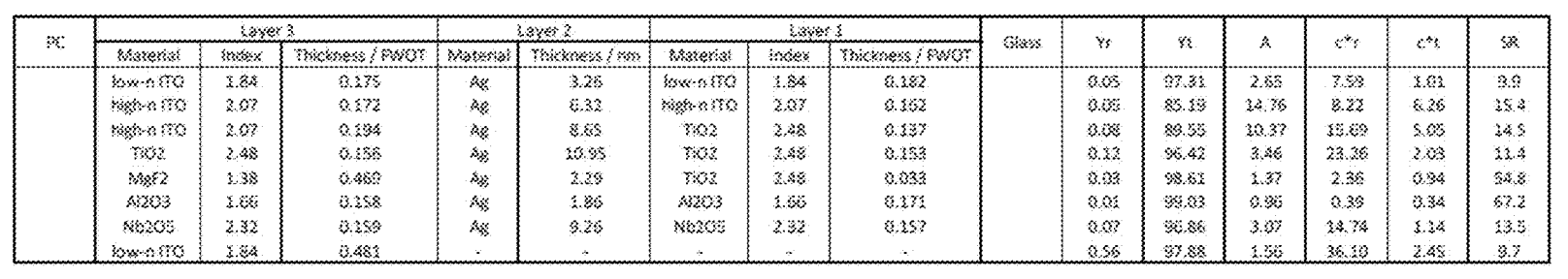

With reference now to FIG. 13, examples of IMI stacks with different insulator materials are shown. The calculated reflectance, Yr, Transmittance Yt, Absorption, A, reflected c*, c*r, transmitted c*, c*t and estimated sheet resistance, SR, are detailed for each IMI stack. In this case, the silver was assumed to have a bulk resistance of 12.5 micro ohm-cm. The sheet resistance of the remaining layers was included to get an estimated sheet resistance for the entire IMI stack. The results of the stacks in this table show that low reflectance may be obtained at varied sheet resistance levels. The transmitted color has low c* values indicating that the transmitted light should have an acceptable color rendering index (CRI). The CRI should be greater than about 80, greater than about 90, and greater than about 95.

The IMI designs taught herein are not limited to the case where the thickness and refractive indices of the insulator layer are symmetric. Alternatively, the thickness and refractive index of the insulator materials may be the same or different. It is understood that the relationships between the insulator and metal described for the symmetric case may not hold for the asymmetric embodiment. The symmetric relationships may then be used as a starting point for optimization for a given asymmetric design.

The design of IMI coatings for a given application may have particular reflectance and sheet resistance properties. The sheet resistance of an IMI coating will depend on several factors which can be controlled somewhat independently from the thicknesses needed for optimal anti-reflection properties. The sheet resistance is a product of the thickness of the silver layer and the bulk resistivity of the layer. The ability to adjust the bulk resistance to higher or lower values will enable tuning of the sheet resistance independent of the thickness. Table 2 below shows the calculated sheet resistance for combinations of thickness and bulk resistance. The optimal bulk resistivity for silver is about 1.6 microohm-cm's. In thin film form it is often challenging to attain this theoretical minimum while it is more practical to increase the bulk resistivity by modifying the conditions under which the layer is deposited or by the addition of dopants into the metal matrix. The methods for adjusting of the bulk resistivity are known to those skilled in the art. One such method is to include in the IMI structure a layer of ZnO immediately below the silver layer as part of the lower insulator layer. The ZnO commonly forms a crystalline structure which is a lattice match to the silver metal. This leads to lower bulk resistivity values and thus the potential for lower sheet resistance values.

With reference now to FIG. 14, the table illustrated demonstrates that the sheet resistance may be modified over a range of values for a given thickness thus enabling the simultaneous tuning of both low reflectance and a given sheet resistance value. The optical properties of the silver layer may change as the bulk resistivity is changed. Optimization should be considered based on the actual refractive indices obtained from a given deposition system. The sheet resistance may be between about 1 and 100 ohms/sq. However, in some instances, the sheet resistance may be between 2 and 50 ohms/sq, or between 4 and 25 ohms/sq. It is also contemplated that the sheet resistance may be less than 30 ohms/sq, or even less than 10 ohms/sq.

Additionally, the overall sheet resistance of the IMI may be reduced by the use of transparent conducting oxides in the stack as the insulator layers. The addition of more layers which conduct electricity will further reduce the sheet resistance. The amount of reduction will be dependent on the thickness of the TCO layer and its bulk resistivity. The values in Table 1 would then be reduced in accordance with the particulars of the TCO in a given application.

Another embodiment which will increase the range of sheet resistance for a given reflectance is the addition of additional pairs of Metal/Insulator or MI pairs. The stack becomes, IMIMI or IMIMIMI, etc. The addition of another entire silver layer essentially halves the values in Table 1 for a given silver thickness. Comparable or improved reflectance properties can be obtained with the additional design dimensions which come from the increased number of layers. As noted above, the insulator and/or metals may be symmetrical in thickness or composition or may be varied as needed to achieve the design goals of a given application.

Figure 11:
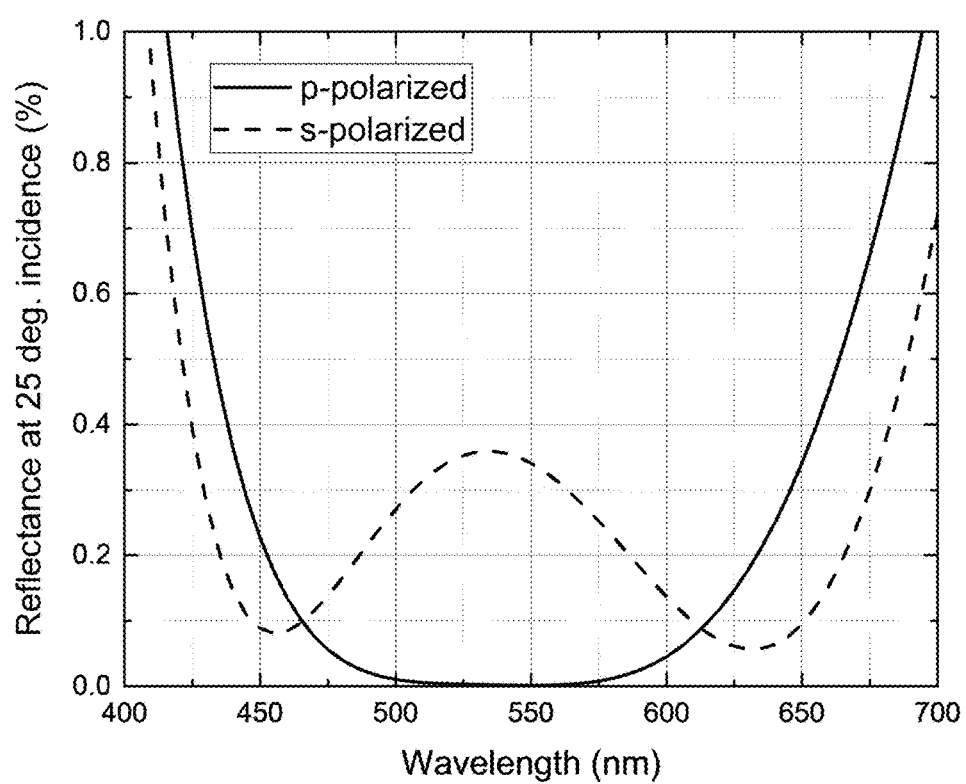
FIG. 11 is a graph illustrating the reflectance versus wavelength of an antireflective electrode at a glass-electrochromic medium interface.

With reference now to FIG. 11, the s and p polarization states are defined herein with respect to the plane defined by the vector normal to the electro-optic assembly 10 and the direction of the light emitted by the heads-up display system 35. In the case where a specialized coating comprising a metallic chrome base layer, a silver transflective layer, and an indium tin oxide (ITO) top coat is used in a second surface transflector orientation, such as that disclosed in U.S. application No. 15/650,540, entitled "SECOND SURFACE TRANSFLECTOR FOR ELECTRO-OPTIC DEVICE," and U.S. application No. 15/650,618, entitled "ELECTRO-OPTIC ELEMENT WITH HIGH DOUBLE IMAGE RATIO," the entire disclosures of which are incorporated herein by reference, the relative magnitude in reflectance between the s and p polarization states is significant and the p polarization state has a lower reflectance than the s polarization state. Therefore, several benefits can be obtained with the use of properly designed coatings and targeted polarization states. Selecting the polarization state of the display to correspond with the p polarization state leads to a negligible reflectance with angle from an IMI anti-reflective electrode with the benefit of minimizing reflections of the projected image coming from the electrode layers. The stack for the reflectance performance depicted in FIG. 11 corresponds to an IMI with ITO as the insulator material layer and a silver based alloy for the metal layer.

With reference again to FIG. 11, the reflectance versus wavelength is illustrated for an anti-reflective electrode coating with an IMI structure optimized to anti-reflect the p polarization state at a 25 degree angle of incidence in the visible spectrum. Specifically, the p and s polarized reflectance is for an IMI stack on a glass/electrochromic medium interface. The reflectance of the coating for the p polarization state is consistently less than that of the s polarization state and reaches a minimum reflectance at an angle of incidence of approximately 25 degrees. The lower reflectance for the anti-reflection electrode coating thus leads to a lower double image and a higher ratio of the principal transflector coating to net reflectance of such an anti-reflective electrode. The fundamental difference in s and p polarization states with angle and having a properly designed coating/display system thus leads to devices with higher ratio of the principle transflector to electrode reflectance, and therefore, less double image.

Figure 12:
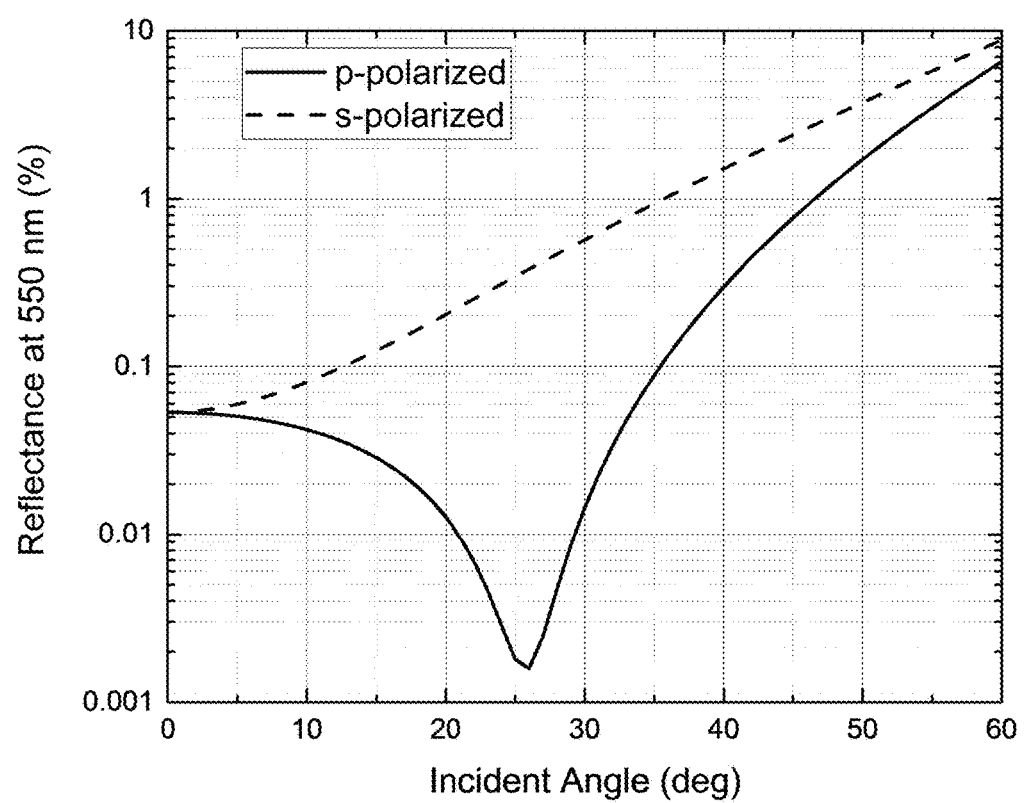
FIG. 12 is a graph illustrating the reflectance at an angle of incidence of 25 degrees versus wavelength of an antireflective electrode at a glass-electrochromic medium interface.

With reference now to FIG. 12, the reflectance versus angle for the coating of FIG. 11 is illustrated. The reference wavelength is 550 nm, which corresponds to the maximum of the photopic sensitivity curve for human eye vision. The reflectance of the p polarization state is less than the reflectance of the s polarization state by over an order of magnitude at approximately 25 degrees of incidence. In principle, the angle of incidence at which the IMI anti-reflective electrode coating has a minimum reflectance may be slightly optimized for a particular angle of incidence by changing the insulating layers, thus allowing the lowest reflectance for a particular angle within approximately 18 to 30 degrees angle of incidence.

In one embodiment, the system may include a display that is configured to emit p polarized light toward the combiner. The combiner would include IMI anti-reflective electrode coatings, which have an angle of incidence-specific minimized reflectance for p polarized light, such that the reflectance of the p polarization is smaller than the s type reflectance by more than about 100% relative at an angle of incidence from 10 to about 45 degrees, or from 15 to about 30 degrees, or from 20 to about 25 degrees, a primary transflective layer, a variable transmittance system and secondary surfaces with anti-reflection coatings optimized for minimizing the reflectance of p polarized light.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic assembly, comprising:
   a first partially reflective, partially transmissive substrate defining a first surface and a second surface;
   a second partially reflective, partially transmissive substrate defining a third surface and a fourth surface;
   a space defined between the first substrate and the second substrate;
   a seal disposed about a perimeter of the first and second substrates;
   an electro-optic material disposed between at least one of the second surface of the first substrate and the third surface of the second substrate, wherein said electro-optic assembly is operable to change at least one of a reflectance state and a transmittance state in either a discrete or continuous manner; and
   a transparent electrode coating disposed on the second surface and the third surface, the transparent electrode coating including an insulator layer, a metal layer, an insulator layer (IMI) structure, wherein a reflectance off of the transparent electrode coating is less than about 2%.

2. The electro-optic assembly of claim 1, wherein the electro-optic material is an electrochromic material.

3. The electro-optic assembly of claim 1, wherein the electro-optic material is a liquid crystal.

4. The electro-optic assembly of claim 1, wherein a "k" value of the insulator layer of the IMI structure is less than about 0.05.

5. The electro-optic assembly of claim 1, wherein a sheet resistance of the IMI structure is less than about 10 ohms/sq.

6. The electro-optic assembly of claim 1, wherein the reflectance is at least one of CIE Y, average reflectance, and weighted reflectance.

7. The electro-optic assembly of claim 1, wherein the transparent electrode coating includes an absorption of less than 10%.

8. The electro-optic assembly of claim 7, wherein the transmittance of the transparent electrode coating is greater than 95%.

9. The electro-optic assembly of claim 1, wherein the IMI structure further includes a ZnO layer below the metal layer of the IMI structure.

10. The electro-optic assembly of claim 1, wherein the reflectance of the transparent electrode coating is less than about 0.25%.

11. The electro-optic assembly of claim 1, wherein said electro-optic assembly is operably coupled with a switchable mirror assembly that is attached to a vehicle.

12. An electro-optic assembly, comprising:
    a first partially reflective, partially transmissive substrate defining a first surface and a second surface;
    a second partially reflective, partially transmissive substrate defining a third surface and a fourth surface;
    an electro-optic material disposed between the second surface of the first substrate and the third surface of the second substrate; and
    a transparent electrode coating disposed on at least one of the second surface and the third surface, the transparent electrode coating including an insulator layer, a metal layer, an insulator layer (IMI) structure, wherein a reflectance off of the transparent electrode coating is less than about 2%.

13. The electro-optic assembly of claim 12, wherein the reflectance of the transparent electrode is less than about 0.25%.

14. The electro-optic assembly of claim 12, wherein an approximate thickness of the metal layer of the IMI structure equals $-17.4$ nm$+11.44*$refractive index of the insulator layer.

15. The electro-optic assembly of claim 12, wherein an optical thickness of the insulator layers is between about $\frac{1}{8}$ to $\frac{1}{3}$ of a full wave.

16. The electro-optic assembly of claim 12, wherein the electro-optic material is an electrochromic material that changes the transmittance of the electro-optic assembly in a continuous manner, and wherein the reflectance is essentially constant with changes to the transmittance.

17. An electro-optic assembly for a heads up display system, comprising:
    a first substrate defining a first surface and a second surface;
    a second substrate defining a third surface and a fourth surface;
    a space defined between the first substrate and the second substrate;
    an electro-optic material disposed between the second surface of the first substrate and the third surface of the second substrate, wherein said electro-optic assembly is operable to change the transmittance state in either a discrete or continuous manner; and
    a transparent electrode coating disposed on at least one of the second surface and the third surface, the transparent electrode coating including an insulator layer, a metal layer, an insulator layer (IMI) structure, wherein a transmittance of the IMI structure is greater than 80% and the reflectance is less than about 1%.

18. The electro-optic assembly of claim 17, wherein the electro-optic material is an electrochromic material.

19. The electro-optic assembly of claim 17, wherein the electro-optic material is a liquid crystal.

20. The electro-optic assembly of claim 17, wherein the reflectance is essentially constant with changes to the transmittance of the electro-optic assembly.

21. A variable transmittance electro-optic assembly, comprising:
    a first partially reflective, partially transmissive substrate defining a first surface and a second surface;
    a second partially reflective, partially transmissive substrate defining a third surface and a fourth surface, wherein the first substrate and the second substrate are configured to be held in a parallel spaced apart relationship and sealed about a perimeter of the first and second substrates;

an electro-optic material disposed between the second surface and the third surface;

a principle fixed transflector including a transflector coating disposed on at least one of the first and second surfaces; and a low reflectance transparent electrode IMI coating disposed on secondary surfaces of said variable transmittance electro-optic assembly, and configured for p polarized light such that the electro-optic assembly has a low double image characteristic defined by a ratio of the reflectance of the transflector coating to a net reflectance of at least one of the secondary surfaces, and wherein the ratio is greater than 100.

* * * * *